Oct. 28, 1930.  C. G. BUTLER  1,780,115
LUBRICATOR
Filed Jan. 5, 1929   3 Sheets-Sheet 3
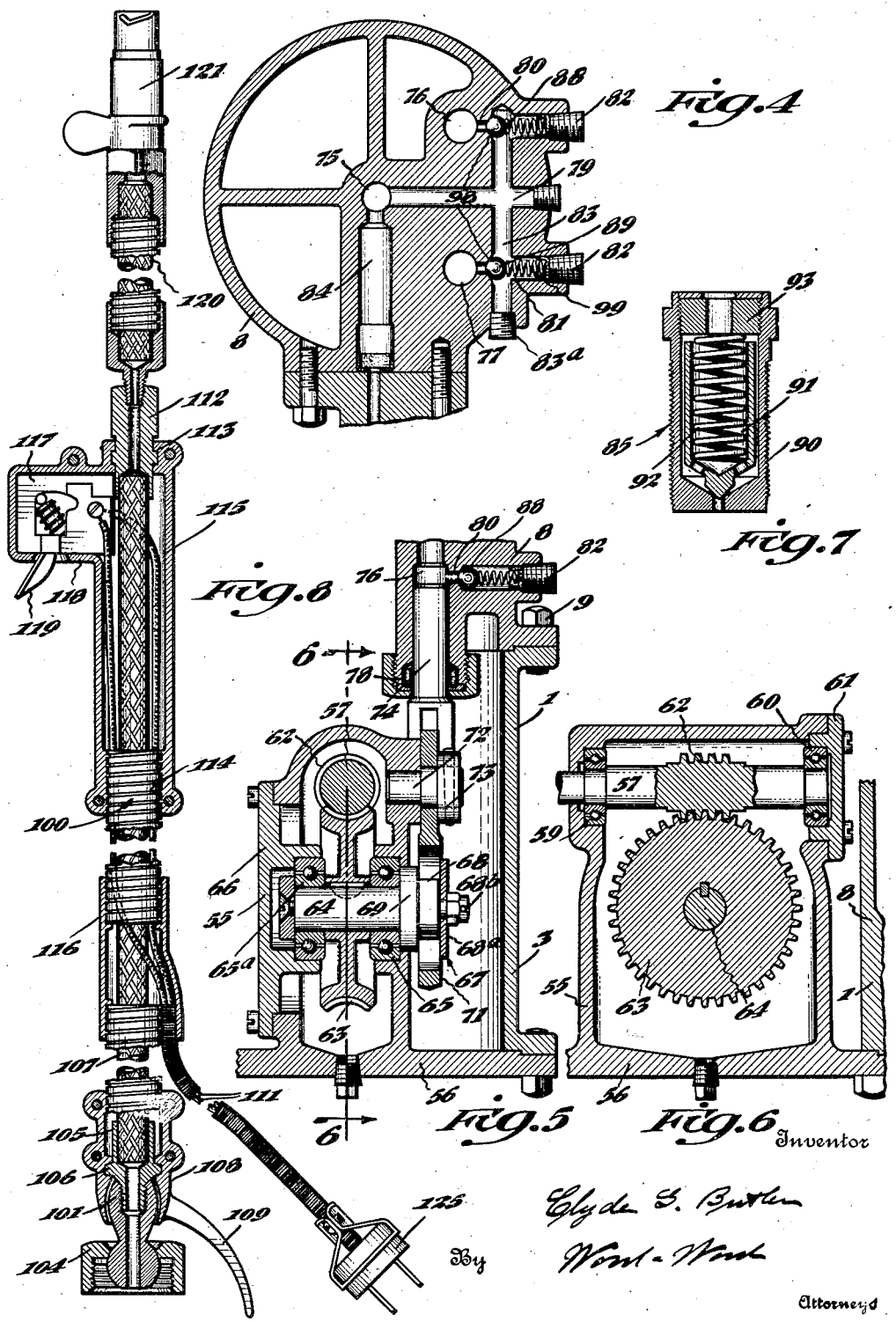

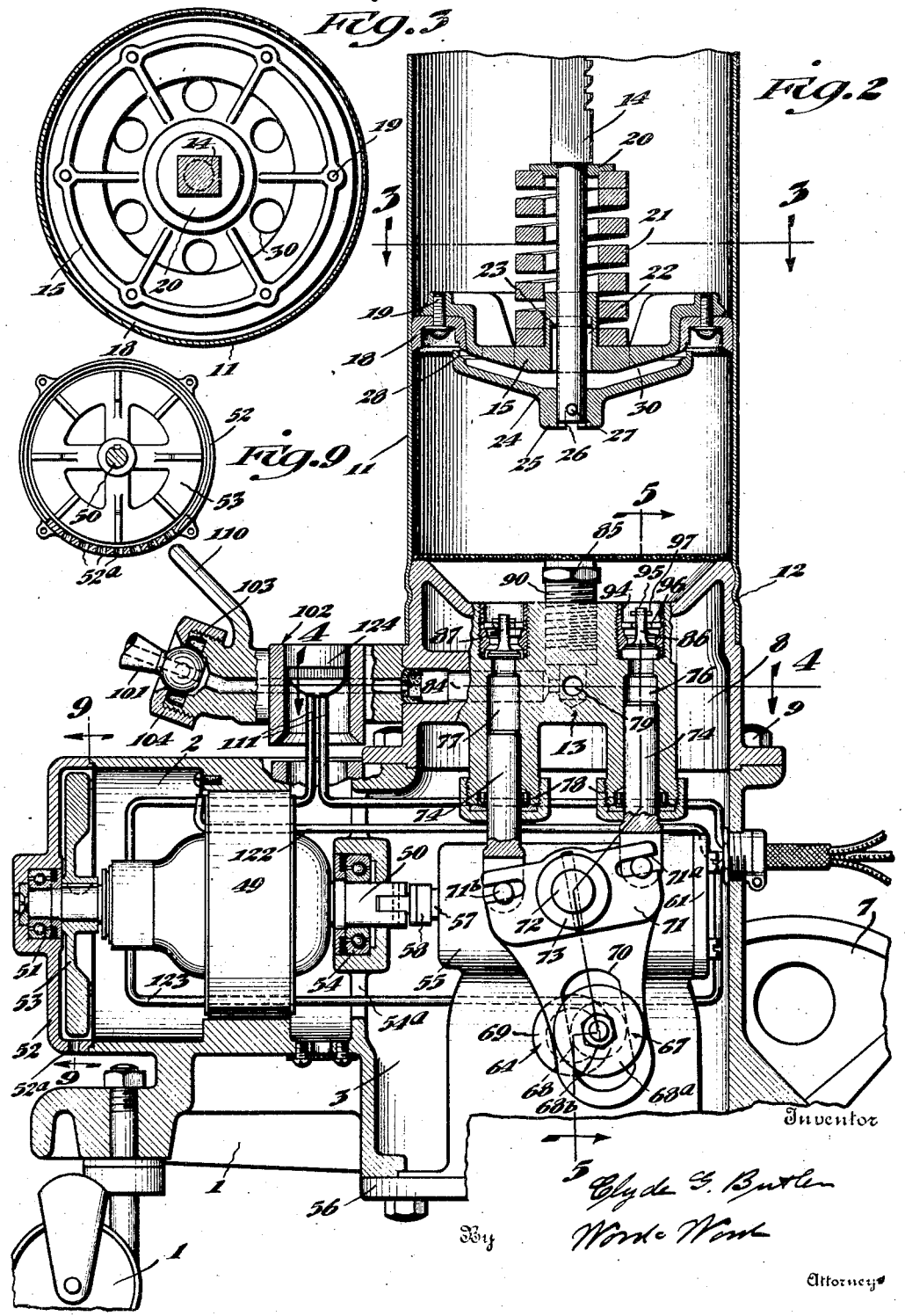

Patented Oct. 28, 1930

1,780,115

UNITED STATES PATENT OFFICE

CLYDE G. BUTLER, OF CINCINNATI, OHIO, ASSIGNOR TO THE CINCINNATI BALL CRANK COMPANY, OF CINCINNATI, OHIO, A CORPORATION OF OHIO

LUBRICATOR

Application filed January 5, 1929. Serial No. 330,671.

This invention relates to electrically operated lubricators adapted for use in systems of the type wherein the machinery to be lubricated is provided with nipples or fittings located at different points thereon and grease or lubricant is supplied to said fittings under pressure, often high pressure, pumping instrumentality through a flexible hose line having on its end a nozzle adapted to cooperate with the fittings or nipples to permit lubricant to be forced therein under the desired pressure.

It is the general object of this invention to provide an electrically operated lubricator adapted to be used in systems of the nature above described, said lubricator particularly suitable for storing a quantity of grease sufficient to service a great many bearings, said lubricator adapted to be moved facilely about the shop or factory in which it is used, adapted to supply a very steady stream of grease under relatively high pressure, and also adapted to be controlled in its operation from a point adjacent and convenient to the bearing being served.

Another object of this invention is to provide an electrically driven multiple piston pump for feeding the steady stream of lubricant under extremely high pressure, incorporating an improved device for converting the rotary motion of an electric motor into reciprocating motion for the plurality of pistons.

Another object of this invention relates to the arrangement of the units of the pump and power whereby the replacement of parts and the assembly thereof are extremely easy.

Other objects and further advantages will be more fully set forth in the description of the accompanying drawings, forming a part of this specification, in which:

Figure 2 is a fragmentary sectional view of the lower end of the lubricator taken centrally therethrough and illustrating the electrically driven pump for expelling the grease under high pressure.

Figure 3 is a sectional view taken on line 3—3, Figure 2, illustrating the follower piston.

Figure 4 is a sectional view taken on line 4—4, Figure 2 through the pump body, illustrating the passageways leading from the reservoir to the discharge conduit.

Figure 5 is a sectional view taken on line 5—5, Figure 2, illustrating the transmission connecting the motor with the pumping pistons.

Figure 6 is a sectional view taken on line 6—6, Figure 5, further detailing the transmission.

Figure 7 is a central sectional view of the relief or pressure-unloading valve for safety discharge of the grease at undue pressures back into the reservoir.

Figure 8 is a longitudinal sectional view of the discharge conduit illustrating in detail the conduit with the electrical wiring extending therethrough to a switch adjacent the discharge end of the conduit.

Figure 9 is a sectional view taken on line 9—9, Figure 2, illustrating the fan for cooling the electric motor and its mounting.

Figure 1:
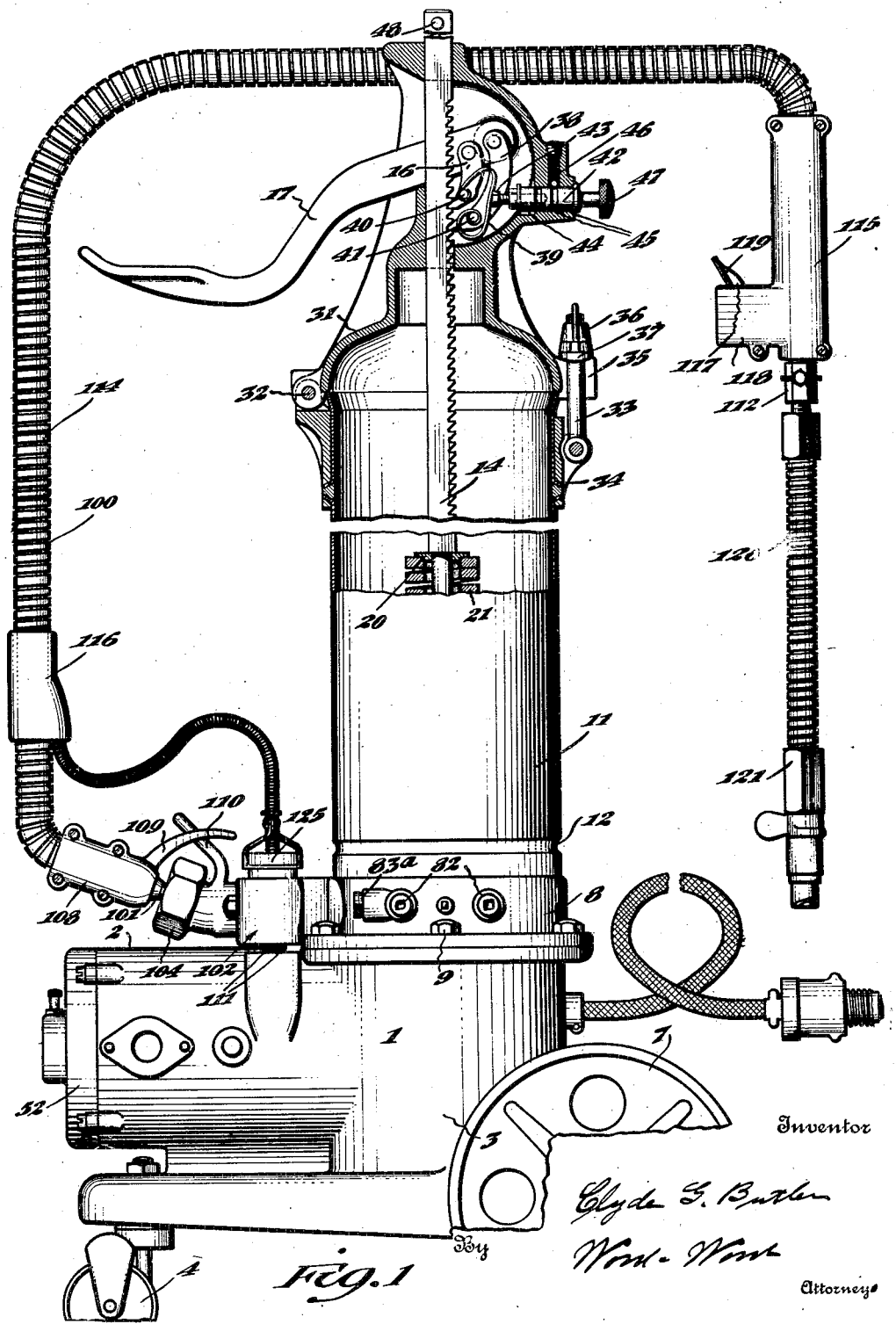
Figure 1 is a side elevation partly in section of the lubricator, the upper portion thereof being broken away to illustrate the jack mechanism and control for operating the follower piston.

The lubricator of this invention comprises a carriage adapted to be moved about the shop, a piston pump mounted upon the carriage, a grease reservoir located over the piston pump and provided with a jack or other means for packing the lubricant in the direction of the piston pump. The piston pump is operated by means of an electric motor or other source of rotary power, reduced motion mechanism attached to the motor, and pitman mechanism placed between the reduced motion mechanism and the piston pump. This pitman mechanism is preferably of the cam surface type as distinguished from the crank shaft type.

This structure is preferred because it is compact, and also because it is susceptible to construction from alloy steels and to case hardening, which greatly strengthens the pitman mechanism and enables it to stand long service during which the grease is being ejected against high resisting pressures which would tend to wear out less staunch constructions. The arrangement of parts, above described, is subject of course, to some modification, particularly in regard to their relation to the carriage, but the piston pump located between the reservoir and the pitman mechanism of the cam type is a distinct feature of this invention.

Referring to the drawings, the numeral 1 indicates a carriage having a casing portion providing cylindrical chambers 2, 3, horizontal and vertical, respectively, forming an inverted L in respect to each other. The casing 1 is mounted on a swivel caster 4 at the rear end and on a pair of wheels 7 at the forward end. Above the vertically disposed cylindrical casing and concentric therewith, the cylinder block 8 of the high pressure pump is mounted by means of bolts 9 which pass through adjoining flanges of the casing and block, respectively. The outer wall of the cylinder block 8 is cylindrical and the lower end of a barrel 11, used as a lubricant reservoir, is engaged over the block and locked thereto by compressing the metal of the barrel into an annular groove 12 in the block 8.

It is, however, the inner depending body 13 of this block in which are disposed the conduits and bores which receive the lubricant from the reservoir, which encloses the lubricant for the generation of pressure, and through which the lubricant is expelled to the hose line.

At the top of the barrel reservoir is provided a plunger rod 14 and piston 15 operated by jack mechanism, the function of which is to force the grease from one end of the reservoir to the other, that is downwardly into the pump conduits in which the pressure is generated.

The mechanism for performing this packing function comprises the follower piston 15 disposed within the barrel, the square piston rod 14 provided with ratchet teeth and extending upwardly therefrom through the top of the cylindrical element or barrel 11, and a pawl member 16 operated by a handle 17 adapted to translate said ratchet downwardly through the barrel to drive the lubricant to one end thereof ahead of the piston 15.

The piston 15 is provided with a leather piston ring 18 in the form of an inverted annular channel, secured thereto by means of screws 19. This piston is attached to the round lower end portion of the rod 14 by means of a washer 20 disposed at the top of the cylindrical extension in engagement with the square ratchet bar, a coiled spring 21 under compression between said washer 20 and the piston 15 having grooves 22 in its hub and the closed upper ends of the grooves engaging a pin 23 diametrically secured in the rod. The piston is therefore slidable upon this cylindrical extension, compressing when forced against the grease, and therefore movable in relation to the ratchet mechanism to a certain extent. The coiled spring normally holds the plunger advanced to its utmost in relation to the cylindrical extension, i. e., it tends to hold the pin 23 in engagement with the upper ends of the grooves.

On the end of the cylindrical extension a circular member or valve plate 24 is slidably disposed, being provided with a hub 25 disposed about the round lower end of the piston rod. This hub 25 is provided upwardly from its lower end with a cross slot 26 engaged by a pin 27 traversing the piston rod at this point. The pin retains the circular member or valve plate upon the end of the cylindrical extension and adjacent the piston 15.

The valve plate is annularly flanged providing a valve edge 28 engageable with the inner flange of the channel packing ring 18 forming a sealing joint on the downward movement of the piston. As the piston is drawn upwardly the valve plate will be separated from the piston due to the tendency of the plate to cling to the grease, and thus will relieve the piston of any suction action since the air will enter the lubricant chamber from above the piston through apertures 30 formed in the piston 15.

The resilient interconnection of the piston with the ratchet, while not necessary is desirable for the purpose of keeping the lubricant under compression and obviates the necessity of operating the pawl and ratchet mechanism each and every time lubricant is discharged. In other words, the flexible connection provides a head pressure stored by operation of the jack to automatically move the piston and maintained during a limited withdrawal of lubricant.

The plunger and jack mechanism are mounted in a casing head 31 which is pivoted to the top of the barrel, constituting the reservoir for the lubricant, by means of a hinge 32. The reservoir is open for filling with lubricant when this casing head is swung backwardly from the barrel, and after filling can be secured in operating relationship to the barrel by means of a lock comprising a rod 33 pivoted to a boss 34 which is attached to the barrel and a split projection 35 extending from the casing head between the arms of which the rod 33 is adapted to be swung and a winged nut 36 adapted to be screwed upon the end of the rod to clamp a plate 37 in the concaved upper surface of the projection from the casing head in such wise as to lock the head to the barrel.

The pawl 16, cooperative with the ratchet and adapted to advance the plunger, is pivoted to the operating handle 17 which is itself pivoted to the casing head. Another pawl 38 utilizes the same pivot point as the handle, the other pawl being pivoted to the handle between this pivot point and the operating end of the handle which extends to the outside of the casing head.

A U-shaped spring 39 has the respective ends thereof coiled to provide sleeves attached to the respective outer ends of the pawls 16, 38, to pins 40 and 41. This spring is in turn intermediately engaged by a plunger 42 mounted in the casing head. This plunger has an adjustable end which engages the spring, said end comprising a bolt 43 screw-threaded into the end of the plunger and adjustably secured in relation thereto by a lock nut 44. The plunger is provided with two annular grooves 45—45 adapted to be selectively engaged by a detent 46. The outer end of the plunger member is provided with a knurled head 47 by which it is adjusted.

The object of these grooves and detent is to hold the plunger against accidental displacement either in the position most advanced into the casing head, in which case it holds the pawls against the ratchet, or in a withdrawn position in which case the pawls may fall free of the ratchet and the piston 15 at the lower end of the ratchet bar may be withdrawn from the barrel into the casing head by lifting the ratchet rod by means of a handle 48 disposed in the upper end of the ratchet bar beyond the top of the casing head. The pawl 16 having the swinging pivot is the piston actuating pawl whereas the pawl 38 functions to maintain the piston in set position.

This entire mechanism constitutes a jack adapted to operate the follower piston 15 to force the lubricant to one end of the reservoir and into the cylinder of relatively small diameter. Other types of jack mechanism can be used interchangeably with the one shown and described.

Power is provided by an electric motor 49 which has its field secured concentrically in the horizontal casing portion of the carriage. The outer end of the shaft 50 of the armature of the motor is journalled by means of a ball bearing 51 in an end cap 52 which is secured to the outer end of the horizontal cylindrical casing portion of the carriage. The end cap is also provided with radial apertures 52ª in its lower rim adapted to permit a current of air to pass therethrough for the purpose of cooling the motor, this current of air set in motion by a fan 53 secured to the motor shaft between the motor and the bearing by means of a key. The other end of the motor shaft is journalled in a ball bearing 54 disposed in the central boss of an internal rib 54ª within the horizontal casing.

Within the carriage, and within the vertically disposed casing portion thereof is mounted a gear box 55 rising integrally from a closure plate 56 for the bottom of said vertical casing portion of the carriage. Within this gear box is a shaft 57 which is aligned with and connected directly to the inner end of the motor shaft by a coupling 58. This shaft is journalled within the gear box 55 by means of two ball bearings, one, 59, mounted in the traversed gear box wall, and the second, 60, disposed within a closure plate 61 secured to the gear box.

Intermediate these two ball bearings the shaft is provided with a worm 62 intermeshed with a worm gear 63 which is keyed to a shaft 64 extending horizontally and at right angles to the worm shaft. The shaft 64 supporting this worm gear is also mounted in ball bearings, one, 65, disposed directly in a gear box wall, and the second, 65ª, disposed in a plate 66 secured against the side of the gear box. This shaft 64 extends through the gear box wall and has a crank 67 formed on its outer end.

More specifically, this crank is formed by an eccentric stud 68 extending from a head 69, and a disk 68ª is secured against the stud concentric therewith by means of a lock nut 68ᵇ engaging a screw-threaded reduced portion of the stud. The stud 68 engages within a slot 70 in the lower portion of a connecting lever 71, the upper portion of which is pivoted to the gear box on its outside by means of a pivot stud 72 secured into the gear box wall. The connecting lever or pitman is held upon the pin by means of a collar 73 secured to the outer end of the pivot pin by means of a fastening pin. The connecting lever 71 is in the nature of a double bell crank lever, the short arms thereof engaged in the yoke-shaped lower ends of the respective pistons and having slots 71ª traversed by cross pins 71ᵇ connecting the lever 71 to the pistons. This connecting lever alternately operates the pistons 74 and continuously expels the lubricant under high pressure. The pin and slot construction provides a floating connection between the swinging bell crank arms and the laterally immovable pistons. The pins 71ᵇ are flattended on the power thrust side where they engage the slot wall to provide greater surfaces in engagement with the walls of the slots.

More specifically, the cylinder block disposed immediately above the carriage is provided with three vertical bores 75, 76, 77, communicating with the reservoir above. One of these bores 75 is centrally disposed. The two bores 76, 77, serve as the cylinders in which the pressure is generated by the pistons 74. Packing glands 78 surround the lower ends of these cylinders and cooperate with the pistons to seal the cylinders.

Three parallel horizontal bores 79, 80, 81, are provided between the vertically disposed bores and the outside of the cylinder block. These bores or recesses lie all in the same horizontal plane and have their outer ends closed by means of plugs 82. A horizontal bore 83 intersects the three above-mentioned horizontal bores and has its outer end closed by a plug 83ª. A horizontal bore 84 extends from the centrally disposed vertical bore and serves as a discharge outlet for the lubricant.

A safety valve 85 is located in the centrally disposed vertical bore 75, the function of the safety valve being to permit lubricant to escape from the discharge passageway back again to the reservoir in case the discharging lubricant should encounter a restriction or obstacle capable of producing back pressure of proportions hazardous to the lubricator.

Valves 86, 87, are provided between the cylinders 76, 77, in which the pressure is generated, and the reservoir, these valves being of the type adapted to permit the lubricant to flow from the reservoir into the cylinders but not in the reverse direction. Two additional valves 88, 89, are provided in the discharge passageways leading from these cylinders, these valves being adapted to permit lubricant to pass outwardly from the cylinders but not in the reverse direction.

More specifically, the safety valve 85 (see Figure 7) comprises, a tubular body 90 provided with a constricted lower opening, said tubular body screw-threaded into the top or counterbored portion of the centrally disposed vertical bore 75. Longitudinally within this tubular member is a sleeve-like valve element 91 having a solid head adapted to seat upon the constricted lower opening of the body in such wise that lubricant can pass from the centrally disposed vertical bore into the reservoir but not in the reverse direction. Within the sleeve-like valve element is a coiled spring 92 held under compression by means of an apertured nut 93 screw-threaded into the top of the tubular body. Through the lower end of the valve 91 openings are provided to permit the lubricant to pass through the inside of the sleeve-like valve element and out through the nut which retains the coiled spring under compression.

Each valve 86, 87, comprises a sleeve body 94 screwed into the enlarged tops of bores 76, 77, a poppet type valve element 95 adapted to seat upon the underside of an internal valve seat projection in the sleeve body. A guide disk 96 is screwed into the sleeve and apertured to permit grease to pass through it and centrally apertured to guide the stem of the valve element 95.

A pin 97 extends through the upper end of each stem to retain the valve in position relative to its seat. These valves, therefore, permit lubricant to flow from the reservoir into the cylinders but not in a reverse direction, acting to close under pumping or upward stroke of the pistons.

Each valve 88, 89, comprises a ball 98 pressed by a spring 99 against a seat formed at the juncture of the passageways 80 and 81 with passageway 83, the springs being under compression against the plugs 82. These valves permit the lubricant to pass outwardly from the cylinders but not in a reverse direction.

The hose line 100 is connected to the nozzle of the lubricator proper by means of a ball and socket universal joint connection comprising a tubular element 101 having a ball-shaped end which seats upon the socket end of a socket 102 secured to the lubricator as a continuation of the discharge passageway. About this ball element is disposed a packing 103 which is held in place by a sleeve nut 104 screw-threaded upon the outer end of the socket 102 for holding the ball-shaped end of the tubular element 101 in engagement with the socket. Into the outer end of the element 101 is screwed a lubricant conduit connector nipple 105 provided with an external flange 106. The flexible lubricant conduit 107 extends away from the lubricator to the point at which the control mechanism is located.

About the tubular member 101 and the nipple 105 screwed into its end is disposed an outer conduit connector sleeve 108 made up of sections secured together by means of screws, rivets, or the like, and held against displacement by the flange 106 engaging an internal groove therein. Each of the parts of the sleeve 108 is provided with a correspondingly upwardly extending arm 109. A stop member 110 extends upwardly from the socket element of the lubricator between these two arms so that rotation of the casing relative to the nozzle is impossible, thereby preventing entangling of electric control wires 111 extending from the lubricator along the lubricant conduit to the outer end thereof.

A coupling element 112 is secured on the outer end of the inner flexible conduit 107, this element being provided with an external flange 113. The outer flexible conduit 114 is secured at its inner end in the sleeve 108 and at its outer end in a casing 115, the casing 115 being attached between the outer end of the outer conduit and the coupling element 112 engaging over the external flange of the element 112.

The outer flexible conduit is in two sections, and a wire entry casing 116 connects the sections at a point adjacent the lubricator end of the conduits, the wires 111 passing into this casing from the outside through a bulged portion radially disposed therefrom and thence extending through the outer flexible conduit into the casing 115. The casing 115 is made of half sections held together by any conventional means, and an electric snap switch 117 is mounted within a radial extension 118 thereof, the two wires of the control circuit being connected to this switch, and the electrical connection between these wires controlled by means of a trigger 119 of the switch extending adjacent the casing.

A flexible lubricant conduit extension 120 is secured to the coupling element 112 and has a coupler 121 attached to its outer end for suitable connection to the fittings being lubricated.

Concerning the electrical wiring for the motor, three leads extend into the lubricator, namely, 111, 122, and 123. One of these, namely, 122, is a ground wire connecting to the body of the lubricator, this ground being for the purpose of carrying off the current in case of a short circuit in the motor charging the body of the lubricator. The wires 111, 123, connect to the motor, the wire 111 being the control circuit wire extending through the discharge conduit as hereinbefore described.

The sections of this wire 111 extend out of the lubricator and are joined to a socket 124 secured in a vertical position in a tubular boss of the socket element connecting the discharge conduit to the body of the lubricator. A plug 125 has the complimentary control leads extending therefrom, and is adapted to be plugged into the mentioned socket.

Having described my invention, I claim:

1. A lubricator adapted for use in high pressure systems, said lubricator comprising, a reservoir for the grease, means for packing the grease toward one end of the reservoir, a piston pump located at that end of the reservoir, an electric motor, reduced motion mechanism connected to said motor, an eccentric member connected to the reduced motion mechanism, a bell crank lever, the arms of said lever provided with slots, one thereof traversed by the eccentric member, and cross pins traversing the others and connecting the same to the respective pistons to expel grease from the lubricator under high pressure.

2. A lubricator comprising a carriage, an electric motor and pitman mechanism mounted within said carriage, a cylinder head mounted over said carriage, with the cylinders disposed over said pitman mechanism, flexible connections between the pistons and the respective arms of the pitman, pistons and valve mechanism associated with said cylinders to constitute the same piston pumps adapted to expel lubricant under pressure, a reservoir for lubricant mounted over said cylinder head, and a jack-operated follower piston disposed in said reservoir to deliver lubricant to said piston pumps.

3. A lubricator adapted for use in high pressure systems, said lubricator comprising, a reservoir for the grease, means for packing the grease toward one end of the reservoir, a piston pump located at that end of the reservoir, an electric motor, reduced motion mechanism of the worm type connected to said motor, an eccentric member connected to the reduced motion mechanism, and a lever pivotally mounted, said lever provided with slots, one if which is engaged for oscillation of the lever by the eccentric member and connecting pins traversing the others of said slots and the lower ends of the pistons of the pump to reciprocate the same to expel grease from the lubricator under high pressure.

4. In a lubricator of the class described, a pump cylinder block, a plurality of pistons mounted therein, means for forcing lubricant into the cylinders of the block, valves for controlling the flow of lubricant during the respective pumping and sucking strokes of the pistons, an electric motor, a crank driven by said motor, a bell crank lever having one arm thereof connected to said crank, and a plurality of arms respectively flexibly connected to the respective pistons of the pump.

5. A lubricator of the class described, comprising, a pump cylinder block, a plurality of pistons therein, means for forcing grease into said cylinder block, valves for controlling the intake and discharge of grease acted upon by said piston, a power source, a crank driven from said source, a bell crank lever having one arm thereof traversed by said crank, and a plurality of slotted arms connected to the respective pistons of the pump, said connections constituted by pins traversing the ends of said pistons and the slots in the ends of the arms, said pins flattened on one side for greater engagement with the walls of the slots imparting the pumping thrust.

6. A lubricator of the class described, comprising, a body having a tubular portion open at both ends and a lateral tubular portion open at its outer end, a pump unit, a power unit, and a transmission unit, each of said units insertable through a respective open end of the tubular portions of the casing and attachable relative thereto and in cooperative relation with each other.

7. A lubricator of the class described, comprising, a pump cylinder block, a plurality of pistons therein, means for forcing grease into said cylinder block, valves for controlling the intake and discharge of grease acted upon by said pistons, a power source, a crank driven from said source, a bell crank lever having one arm thereof traversed by said crank, and a plurality of slotted arms connected to the respective pistons of the pump, said connections constituted by pins traversing the ends of said pistons and said slots in the ends of the arms.

8. A lubricator of the class described, comprising, a pump cylinder block having a pair of cylinders therein, a piston in each cylinder, means for forcing the grease into the cylinders, valves for controlling the intake and discharge of grease from the cylinders, an eccentric shaft, a motor for driving said shaft, a pivotally mounted T-shaped bell crank lever, the pivot thereof being provided at the intersection of the respective arms of the lever, the long arm thereof having a slot therein traversed by the eccentric, and the short arms flexibly connected to the outer ends of the respective pistons whereby continuous grease forcing action is exerted within the cylinders.

In witness whereof, I hereunto subscribe my name.

CLYDE G. BUTLER.